United States Patent [19]
Fawcett et al.

[11] 4,059,022

[45] Nov. 22, 1977

[54] DRIVE ASSEMBLY

[75] Inventors: John Neville Fawcett, Newcastle-upon-Tyne; Stuart William Nicol, Tow Law, both of England

[73] Assignee: National Research Development Corporation, London, England

[21] Appl. No.: 745,969

[22] Filed: Nov. 29, 1976

[30] Foreign Application Priority Data

Nov. 27, 1975 United Kingdom ............... 48829/75

[51] Int. Cl.² .......................... F16H 7/00; F16H 7/12; F16H 7/10
[52] U.S. Cl. .............................. 74/226; 74/242.1 TA; 74/242.1 SR
[58] Field of Search ............... 74/242.1 TA, 226, 227, 74/242.15 R

[56] References Cited

U.S. PATENT DOCUMENTS

| | | | |
|---|---|---|---|
| 488,698 | 12/1892 | Payne | 74/227 X |
| 502,041 | 7/1893 | Jacoby | 74/227 X |
| 1,401,629 | 12/1921 | Meyers | 74/226 X |
| 2,627,357 | 2/1953 | Biedess | 74/226 X |

*Primary Examiner*—Leonard H. Gerin
*Attorney, Agent, or Firm*—Finnegan, Henderson, Farabow & Garrett

[57] ABSTRACT

A drive assembly comprises an elongated endless drive member, for example a roller drive chain, engaged on a rotary drive member, for example a drive sprocket, and arranged to be driven by the rotary drive member. A guide member, preferably a guide wheel defines a guide surface urged against the tight strand of drive chain on the opposite side to that engaged by the sprocket. The guide surface of the guide member is positioned in contact with the drive chain in the region of initial engagement of the drive chain on the drive sprocket and is arranged to guide the drive chain member on to the drive sprocket. The guide member is positioned for eliminating or inhibiting any radial component of velocity of the drive chain relative to the drive sprocket during engagement of the drive chain by the drive sprocket.

15 Claims, 8 Drawing Figures

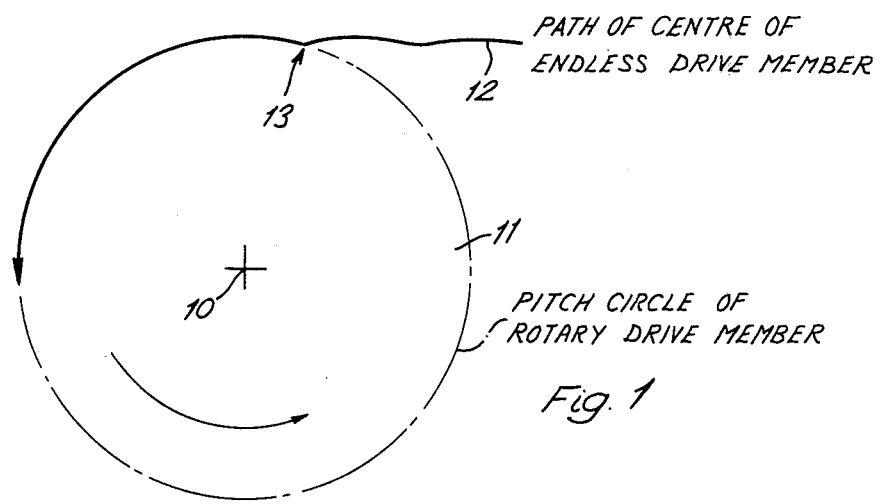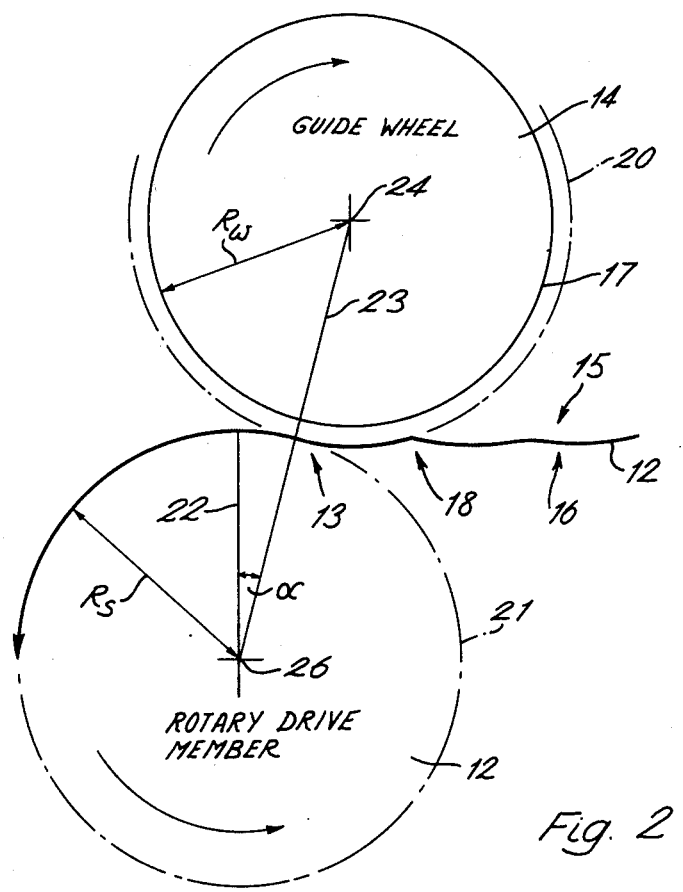

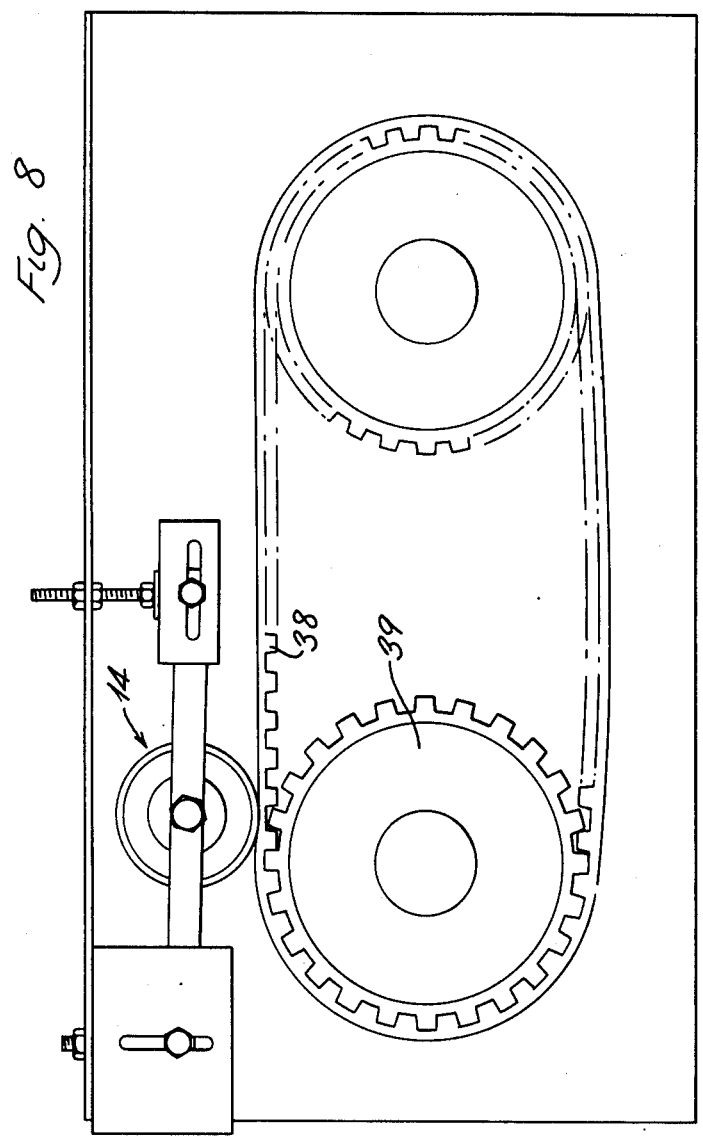

DRIVE ASSEMBLY

The present invention relates to drive assemblies which include an elongated, endless drive member such as a drive chain, engaged on a rotary drive member such as a drive sprocket, and is concerned in particular, but not exclusively, with roller chain drive assemblies.

One of the main drawbacks of the conventional roller-chain drive is the impact which occurs whenever a tooth of the driving sprocket picks up a chain roller from the chain span. The impact leads to the vibration of the roller on the tooth, which is the major source of chain-drive noise in high-speed transmissions. It also causes high stresses in the chain roller and hence is a limitation on the maximum speed of the chain.

The impact force can be substantially reduced by using sprocket teeth made from a flexible material. Plastics are sometimes used, but severely reduce the load capacity of the drive since high loads quickly hammer the teeth out of shape.

According to the present invention there is provided a drive assembly comprising an elongated endless drive member engaged on a rotary drive member and arranged to be driven by the rotary drive member, and a guide member defining a guide surface arranged to be urged against the endless drive member on that strand of the endless drive member which in operation is tensioned by the drive of the rotary drive member and on that side of the tight strand of the endless drive member which is opposite that engaged by the rotary drive member, the guide surface of the guide member being positioned in contact with the endless drive member in the region of initial engagement of the endless drive member on the rotary drive member and being arranged to guide the endless drive member on to the rotary drive member, the guide member being so positioned as to eliminate or inhibit any radial component of velocity of the endless drive member relative to the rotary drive member during engagement of the endless drive member by the rotary drive member.

The elongated endless drive member may comprise a drive chain and the rotary drive member may comprise a drive sprocket engaging the drive chain. Conveniently the guide surface of the guide member is of soft resilient material relative to the hardness of the drive chain.

The guide member may define a stationary guide surface which, depending on conditions, may have sliding contact with the endless drive member or, where the endless drive member is a roller chain, may have rolling contact by virtue of rotation of the rollers. Preferably however the guide member comprises a guide wheel defining the said guide surface around the perimeter of the wheel and having rolling contact with the endless drive member by virtue of rotation of the guide wheel. Conveniently the guide wheel is mounted for rotation about an axis parallel to the axis of rotation of the rotary drive member.

The invention is particularly applicable where the drive chain is a roller chain, and the guide surface of the guide member is preferably arranged to rest against the rollers of the roller chain. Conveniently the guide surface is a plain surface.

It may be convenient in some arrangements of the invention to include on a guide wheel small teeth or serrations so long as these are arranged not to interfere with the sprocket teeth on the rotary drive member when this is a sprocket wheel.

Preferably there are provided means for urging the guide member against the endless drive member to an extent such that the endless drive member follows around the guide surface of the guide member due to the tension in the endless drive member and then transfers to the rotary drive member. Preferably the said means for urging the guide member against the endless drive member includes means for varying the force applied to urge the guide member against the endless drive member. In practice the optimum position for the guide member may be arrived at either empirically, or by visual assessment of the geometry of the assembly, or by a combination of the two methods. The position of the guide member may be chosen empirically by increasing the force urging the member against the endless drive member until minimum noise is achieved. This gives an indication of the optimum position for least wear and maximum operating life of the components.

With regard to the geometry of preferred arrangements of the invention where the guide member comprises a guide wheel, the endless drive member comprises a drive chain and the rotary drive member comprises a drive sprocket, there are a number of interrelated criteria for good performance.

It is preferred that the angle (referred to hereinafter as the guide angle) between a line joining the centres of the guide wheel and the drive sprocket, and a radius of the drive sprocket which is normal to the general direction which the chain would have in the absence of the guide wheel, is greater than half the pitch angle of the drive sprocket. It is preferred that the said guide angle is made as nearly equal as possible to half the pitch angle of the drive sprocket, but the guide angle may be greater, for example in the range of half to one and a half times the pitch angle of the drive sprocket.

It is also preferred that the diameter of the guide wheel is less than the diameter of the drive sprocket, but the diameter of the guide wheel should closely approach the diameter of the sprocket. In practice the size of the guide wheel will usually be restricted by considerations of space available, and its exact size will depend among other factors on the softness of its surface.

One distinction in the embodiments of the present invention which arises over known arrangements in which a slipper guide is used on the tight strand of the drive chain, is that such slipper guides are applied to the chain away from the region of initial engagement of the chain on the drive wheel. A distinction of embodiments of the present invention over chain tensioners is that chain tensioners are applied to the slack strand of the drive chain. Also it will be appreciated that with regard to both these known elements which are applied to drive chains, the purpose of the known elements is entirely different from that of the present invention and the known elements are not applied in the position required in order to reduce noise and wear as is described with regard to the present invention.

An embodiment of the invention will now be described by way of example with reference to the accompanying drawings, in which:-

FIG. 1 shows in diagrammatic form a known chain drive assembly;

FIG. 2 shows in diagrammatic form a chain drive assembly modified to embody the present invention;

FIG. 8 is a diagrammatic view of a further embodiment of the invention showing use of the invention with a toothed drive belt and toothed drive wheel.

Figure 3:
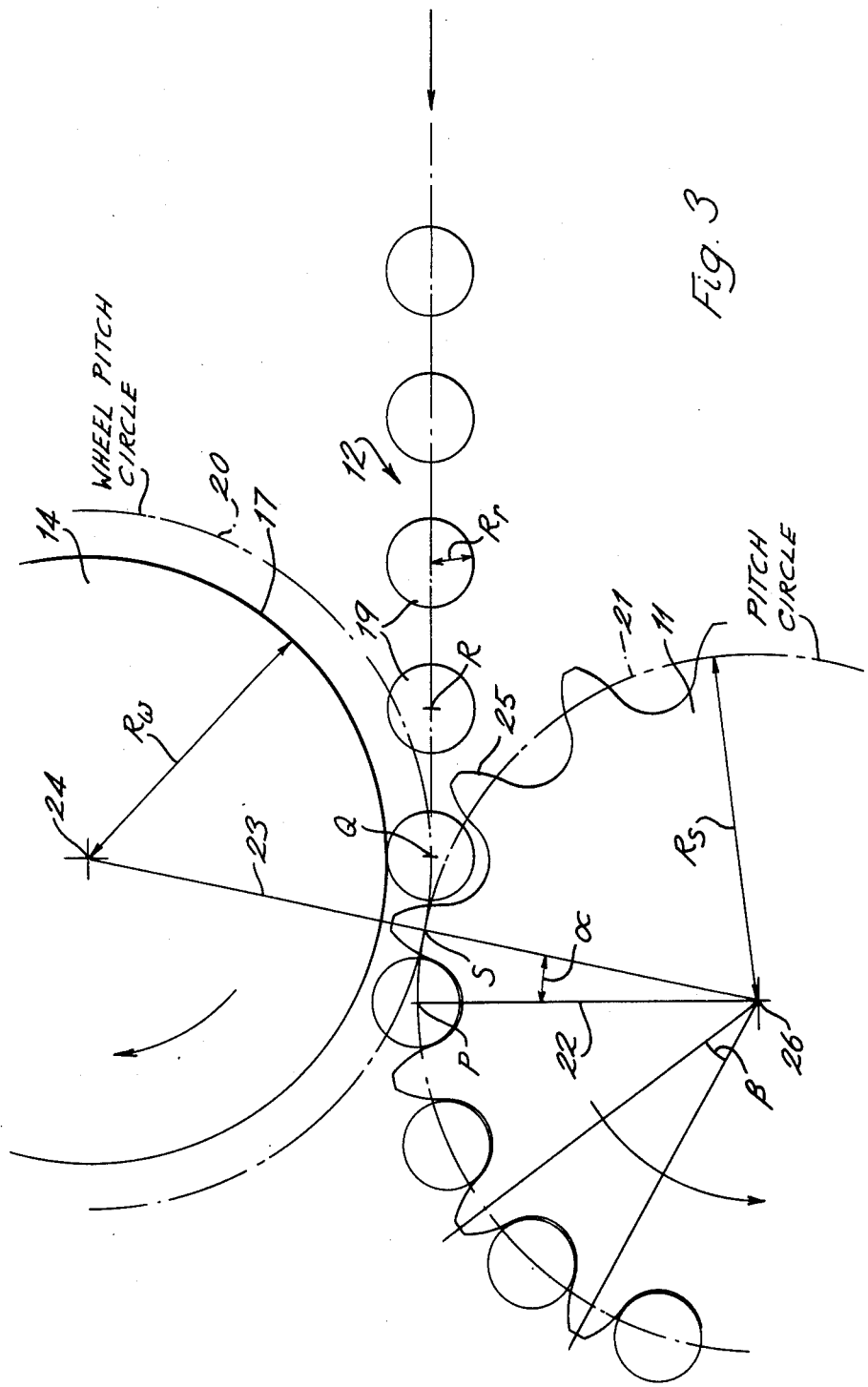
FIG. 3 is a side section in diagrammatic form through the drive sprocket and chain of the chain drive assembly embodying the invention.

In FIG. 1 there is shown in diagrammatic form a drive assembly comprising a rotary drive member 11 on which is engaged an elongated endless drive member 12. The elongated endless drive member may be a drive chain and the rotary drive member may be a drive sprocket. In other embodiments the elongated endless drive member may be a toothed drive belt and the rotary drive member may be a toothed drive wheel. However, for simplicity, the principle of the invention will be described with reference to FIGS. 1 and 2 by referring to the endless drive member 12 as a drive chain and to the rotary drive member 11 as a drive sprocket.

As has been said, one of the main drawbacks of a conventional roller chain drive is the impact which occurs whenever the driving sprocket picks up a chain roller from the chain span. In FIG. 1, the impact is shown to occur in the region indicated by the reference numeral 13, slightly ahead of the axis 10 of the sprocket wheel 11.

In FIG. 2 there is shown a modification which embodies the present invention. The modification consists of the provision of a guide wheel 14 which is urged against the tight strand of the chain 12 on the upper side 15 opposite to the lower side 16 which is engaged by the sprocket 11. The guide wheel 14 is positioned at the region 13 of initial engagement of the drive chain on the sprocket 12. The guide wheel 14 is urged downwardly against the chain 12 to an extent such that the chain 12 follows round the outer perimeter of the wheel 14 and then transfers to the drive sprocket 11. The initial impact of the drive chain 12 now occurs in the area indicated at 18 on the guide wheel 14 instead of on the drive sprocket 11. As can be seen by comparing FIGS. 1 and 2, the presence of the guide wheel 14 can produce a change in the motion of the chain roller centres. Without the wheel 14 in contact, there is a sudden change in direction of a roller as it meets the sprocket 11 which causes an impact. With the wheel 14 in operation, the roller is guided smoothly onto the sprocket 11, the impact now occurring on the resilient surface of the wheel 14 without causing excessive noise.

The outer surface of the rim of the wheel 14 provides a guide surface 17 which is formed of resilient material. There is also shown in FIG. 2, and in FIG. 3, the pitch circle of the wheel 14 which is indicated at 20. The guide wheel 14 may comprise a metal wheel covered with a layer of resilient material, for example a nitrile rubber coating bonded on to a steel wheel. The guide surface 17 of the wheel 14 is preferably a plain surface and is arranged to bear on the rollers of the chain 12.

As has been mentioned, it is known to attempt to reduce noise in roller chain assemblies by forming the sprocket teeth of flexible materials such as synthetic plastics material. However, these known arrangements suffer from the disadvantage that the teeth are quickly worn by the load of the chain rollers. With the present invention, the impacts of the chain can be arranged to occur on the resilient soft material at the perimeter of the wheel 14 but, since the wheel 14 transmits no torque and need not have teeth, its surface does not wear to any significant degree. Thus in the embodiment of the invention shown, the impact of the chain which normally occurs on the sprocket can be absorbed on the guide wheel with consequent reduction in noise and wear.

Referring now to FIG. 3, there is shown in more detail the embodiment of the invention shown diagrammatically in FIG. 2. The chain 12 in FIG. 3 is a roller chain comprising rollers 19 and side links (not shown). The drive sprocket 11 has teeth 25, and a pitch circle indicated at 21 having a radius Rs. Each of the rollers 19 has a radius Rr and the guide wheel 14 has a physical radius Rw and a pitch circle radius of Rw + Rr.

One of the factors determining the position of the wheel 14 relative to the chain 12 and the sprocket 11 is the angle α, referred to in this specification as the guide angle, which is the angle between a radius 22 of the sprocket 11 which is normal to the general direction of the chain 12 as it would be in the absence of the guide wheel 14, and a line 23 joining the centre 26 of the sprocket 11 with the centre 24 of the guidewheel 14. In FIG. 3 there is shown diagrammatically an ideal case in which the guide angle α is made equal to half the pitch angle β of the sprocket 11. In practice the guide angle α is preferably made equal to or greater than half the pitch angle β of the drive sprocket 11. The guide angle α is preferably made as nearly equal as possible to half the pitch angle β, and preferably no more than two or three times half the pitch angle β.

There is also shown in FIG. 3 a theoretically ideal relationship between the radii of the sprocket 11, the guide wheel 14 and the rollers 19. This ideal condition is that the distance between the centre of the sprocket 11 and the centre of the wheel 14 shall be equal to the sum of the radii of the sprocket 11, the roller 19, and the guide wheel 14. In practice however, where the guide surface 17 of the guide wheel 14 is particularly soft, it may be preferable to make the distance between the axes 24 and 26 slightly less than the sum of the radii Rw, Rr and Rs. It is also preferred that the pitch radius (Rw + Rr) of the guide wheel should be not greater than the radius Rs of the drive sprocket, but that the pitch circle radius (Rw + Rr) of the wheel should closely approach the radius Rs of the sprocket.

There will now be described, by way of example with reference to FIG. 3, the factors which need to be considered in arranging embodiments of the invention. In FIG. 3 the axes of three succeeding rollers 19 are indicated by the letters P, Q and R, and in the plane of the Figure the pitch circles 21 and 17 intersect at a point S.

The impact which occurs when a roller 19 is picked up by the sprocket 11 is caused by the radial relative velocity between the roller 19 and the point on the sprocket where the roller will be after its pick-up. This relative velocity can be virtually eliminated if the incoming roller 19 is guided so that its centre Q is moving tangentially to the sprocket pitch circle 21 at the instant before contact between roller and tooth occurs. One method of causing a roller to follow such a path is to use the guide wheel 14 as shown in FIG. 3.

As shown, the wheel 14 is arranged so that its pitch circle 20 is tangential to the pitch circle 21 of the sprocket wheel 11, and the two pitch circles 17 and 21 touch at the point S. When a roller 19 is on the wheel 14, the centre Q of the roller will be moving along the pitch circle 20 of the wheel 14. Therefore, when the roller centre Q reaches the point S, it will also be moving tangentially to the sprocket pitch circle 21. The size and position of the wheel 14 are preferably chosen so that the chain roller 19 leaves the wheel 14 at the point S which is the point at which it first comes into contact with the sprocket 11. In this way, the roller 19 is picked up while its centre is moving tangentially to the sprocket pitch circle 21.

In the diagram, the roller 19 with axis Q will be picked up when the axis Q and the point S coincide, which will happen when the sprocket 11 has rotated from the position shown through an angle of $\pi/Z$ radians where Z is the number of teeth on the sprocket 11. Until that time, the roller 19 with axis Q will be held on the wheel because the angle PQR is made to be smaller than 180° ($\pi$ radians), and therefore the tension in the links between centres P and Q and Q and R has a component acting on the roller of axis Q in the direction of the centre of the wheel 14. The angle PQR will become equal to $\pi$ when the axis Q is at a point S, if the pitch-circle radius (Rw + Rr) of the wheel 14 is the same as the pitch-circle radius Rs of the sprocket 12 as in FIG. 3.

If the pitch-circle radius (Rw + Rr) of the wheel 14 is larger than the sprocket radius Rs, the angle PQR will equal $\pi$ before the axis Q has reached the point S. Consequently the roller 19 having axis Q will leave the wheel 14 too soon and will meet the sprocket 11 with some relative velocity, although not as much as with no wheel 14 at all. If the pitch-circle radius (Rw + Rr) is smaller than that of the sprocket Rs, the angle PQR will equal $\pi$ after the axis Q has passed the point S, giving rise to the possibility that the roller 19 will bounce on the tooth 25 after its initial contact at the tooth S.

The situation is complicated by dynamic and frictional effects but these are generally small provided that the chain tension is kept near the maximum rated value. Also, it is preferable that the wheel be coated with a relatively flexible material, such as synthetic rubber, in order to minimise the impact loadings and noise when the rollers first meet the wheel. These factors mean that the path of the rollers 19 on the wheel 14 is not a perfect arc of a circle and is likely to have a slightly larger radius than the pitch-circle radius 20 of the wheel 14. Therefore, in practice, the wheel 14 must have a pitch-circle radius (Rw + Rr) slightly less than the sprocket radius Rs, preferably about three-quarters of the sprocket pitch-circle radius Rs. The exact value will not usually be critical and can best be determined for a particular installation by experimental trial.

As far as the position of the wheel 14 is concerned, ideally its pitch-circle 20 should be tangential to the pitch-circle 21 of the sprocket. In practice, dynamic, frictional and flexibility effects mean that the best radial position must be found by experimental trial. As has been said the angle $\alpha$ is preferred to have a minimum magnitude of $\pi/Z$ radians, that is to say half the pitch angle $\beta$ but again the best value can be found by trial. The optimum value is unlikely to need to be bigger than $2\pi/Z$ radians. i.e. equal to the pitch angle $\beta$. The wheel 14 will operate with a larger angle than $\beta$ but the size is unnecessary and increases the load on the bearings of the wheel 14 since more rollers are in contact with the wheel simultaneously.

Figure 4:
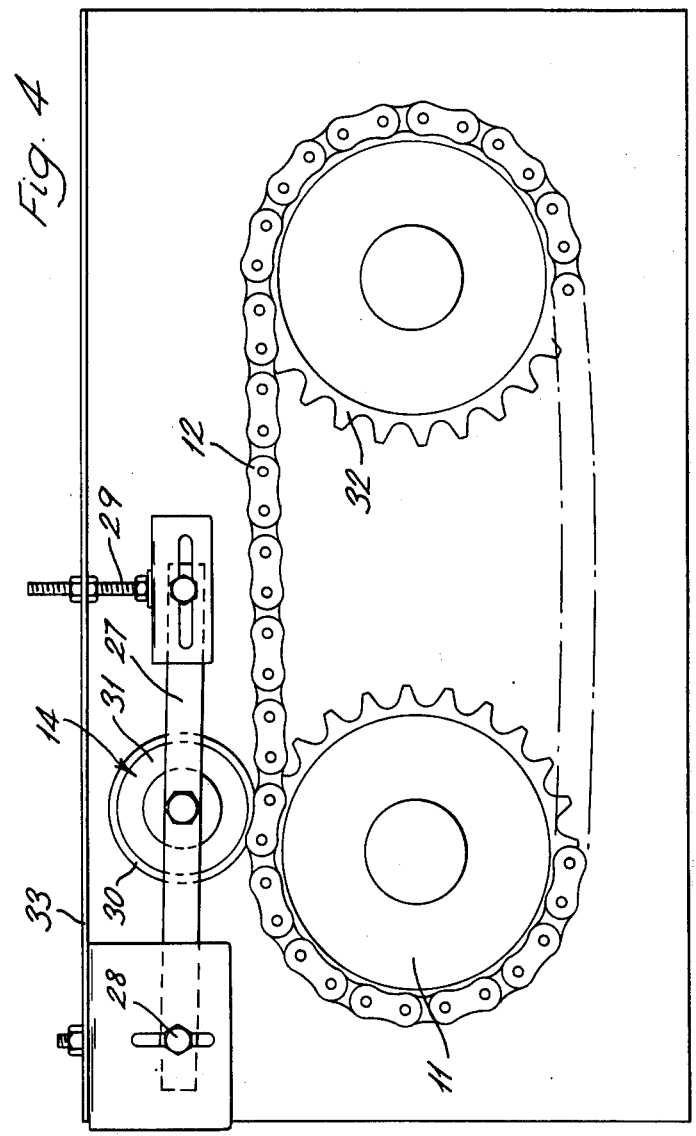
FIG. 4 is a side elevation of another chain drive assembly embodying the invention.
Figure 5:
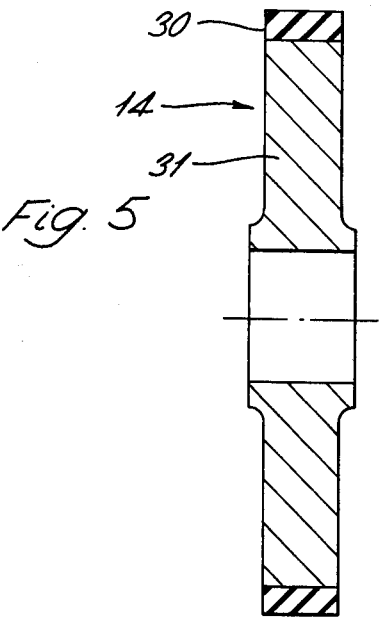
FIG. 5 is a section through a guide wheel shown in FIG. 4.

In FIG. 4 there is shown in side view a further embodiment of the invention similar to that shown in FIG. 3, but showing in more detail means for varying the force applied to the guide wheel to urge it against the drive chain. In FIG. 4 elements corresponding to elements shown in FIG. 3 are indicated by like reference numerals. As can be seen, the guide wheel shown in FIG. 4 has a smaller diameter than that shown in FIG. 3. The guide wheel 14 is mounted on a substantially horizontal arm 27 which is pivoted at its left hand end by a pivot 28, on a frame 33. The guide wheel 14 is brought into contact with the rollers of the chain 12 by adjustment made to a vertical screw 29 coupled to the right hand end of the arm 27. The guide wheel 14 is conveniently mounted on ball bearings and has a plain cylindrical surface around the perimeter as is shown in FIG. 5. In FIG. 5 the wheel 14 is shown as having a resilient covering 30 around its perimeter mounted on a central metal core 31.

By way of example the dimensions of the elements in the embodiments shown in FIGS. 4 and 5 may be as follows:-
Pitch of chain 12 .... 1"
No. of teeth on
sprockets 11 and 32 .... 26 on each
Span of chain 12 .... 13"
Diameter of guide
wheel central core 14 .... $3\frac{1}{2}$"
Thickness of nitrile
rubber coating 30 .... 3/16"
Axial depth of
guide wheel 14 ... $\frac{1}{2}$"

Where for example an embodiment such as shown in FIGS. 4 and 5 is operated with a mean chain tension of 5,000 N and the guide angle $\alpha = 1\ 2/3(\pi/Z)$, the use of guide wheel 14 has produced a reduction in noise attributable to the chain of the order of 10 dBA over a fairly wide frequency range. The main reduction in noise has been found in that example to be above 2 kHz for speeds of rotation in the region of 700 to 900 rpm.

Figure 6:
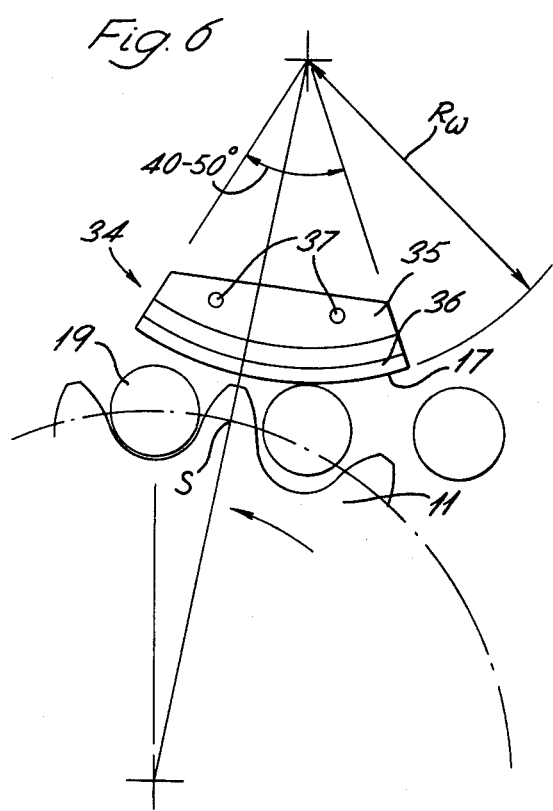
FIG. 6 is a diagrammatic side view partly in section showing a further embodiment of the invention using a non-rotary guide member.
Figure 7:
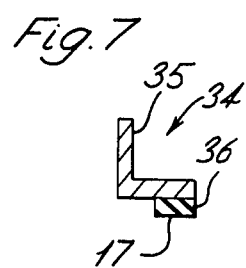
FIG. 7 is a section through the non-rotary guide member of FIG. 6.

In FIGS. 6 and 7 there is shown in diagrammatic form an embodiment of the present invention with a non-rotating guide member 34 in place of the freely rotating guide wheel 14 of the preceding figures. The guide member 34 comprises in effect a lower quadrant of a wheel 14 in the previous figures so as to provide a curved guide surface 17 of the same radius as a guide wheel 14, but not capable of rotation. In the example shown, the guide member 34 comprises an angle-section core 35 carrying a layer of nitrile rubber 36, the member 34 being mounted by means of mounting holes 37 in a position corresponding to that described previously with reference to a guide wheel 14.

An advantage of the embodiment of the invention shown in FIGS. 2 to 5 over some conventional slipper guides on chain assemblies (and over the embodiment of FIGS. 6 and 7) is that where the guide member is a wheel 14 freely rotating about its axis 24, the rollers 19 are allowed to meet the teeth 25 of the sprocket 11 with little rotation about the axes of the rollers. Where a conventional slipper guide is used in some known arrangements, the rollers 19 may roll against the slipper guide and may arrive at the sprocket with a component of rotary motion in the opposite direction to that which is applied by the sprocket upon engagement. Thus the rollers in known arrangements may make initial engagement on the sprocket with the rollers spinning in the wrong direction, and this may add to the vibration and noise of the rollers on the sprocket. Such a disadvantage would of course also apply to the embodiment of the invention shown in FIGS. 6 and 7.

In FIG. 8 there is shown a further alternative embodiment of the invention in which a guide wheel is applied to reduce noise and wear in a drive assembly where a toothed drive belt is engaged upon a toothed drive wheel. It is to be appreciated that the arrangement shown in FIG. 8 is included as a diagrammatic representation only of the use of the present invention in applications concerning toothed drive belts.

In FIG. 8 a toothed belt 38 is engaged upon a toothed drive wheel 39 and a guide wheel 14 is urged against the tight strand of the drive belt 38 in a position such as to eliminate or inhibit any radial component of velocity of the toothed drive belt 38 relative to the drive wheel 39 during engagement of the drive belt on the drive wheel. In general the considerations which have been set out with regard to the preceding figures with reference to a roller drive chain may also be adapted to determine in the case of the tooth drive belt of FIG. 8 the most advantageous position for the guide wheel 14.

We claim:

1. A drive assembly comprising:
an elongated endless drive member;
a rotary drive member, said endless drive member being engaged on said rotary drive member for being driven by the rotary drive member and having a strand extending from said rotary drive member which in operation of the drive assembly is tensioned by the drive of the rotary drive member;
a guide member defining a guide surface; and
mounting means for mounting said guide member and for urging said guide member against the endless drive member on said tensioned strand of the endless drive member and on the side of said tensioned strand of the endless drive member which is opposite that engaged by the rotary drive member;
the guide surface of the guide member being positioned in contact with the endless drive member at the region of initial engagement of the endless drive member on the rotary drive member for guiding the endless drive member on to the rotary drive member, and for eliminating or inhibiting any radial component of velocity of the endless drive member relative to the rotary drive member during engagement of the endless drive member by the rotary drive member.

2. An assembly according to claim 1 in which the elongated endless drive member comprises a drive chain and the rotary drive member comprises a drive sprocket engaging the drive chain.

3. An assembly according to claim 2 in which the guide surface of the guide member is of soft resilient material relative to the hardness of the drive chain.

4. An assembly according to claim 3 in which the guide member comprises a guide wheel defining the said guide surface around the perimeter of the wheel.

5. An assembly according to claim 4 in which the guide wheel is mounted for rotation about an axis parallel to the axis of rotation of the rotary drive member.

6. An assembly according to claim 5 wherein s straight line joining the centers of said drive wheel and said rotary drive member on the one hand and a line forming the radius of said rotary drive member at a location extending normal to the direction said tensioned strand would extend from said drive member in the absence of said guide member on the other hand define a guide angle, said guide angle being substantially equal to half the pitch angle of the drive sprocket.

7. An assembly according to claim 5 wherein a straight line joining the centers of said drive wheel and said rotary drive member on the one hand and a line forming the radius of said rotary drive member at a location extending normal to the direction said tensioned strand would extend from said drive member in the absence of said guide member on the other hand define a guide angle, said guide angle being not less than half the pitch angle of the drive sprocket.

8. An assembly according to claim 5 wherein a straight line joining the centers of said drive wheel and said rotary drive member on the one hand and a line forming the radius of said rotary drive member at a location extending normal to the direction said tensioned strand would extend from said drive member in the absence of said guide member on the other hand define a guide angle, said guide angle being in the inclusive range of half to one and a half times the pitch angle of the drive sprocket.

9. An assembly according to claim 4 in which the diameter of the guide wheel is substantially equal to the diameter of the rotary drive member.

10. An assembly according to claim 4 in which the diameter of the guide wheel is less than the diameter of the drive sprocket.

11. An assembly according to claim 4 wherein the endless drive member is a roller drive chain, and the guide surface of the guide member is arranged to rest against the rollers of the roller chain.

12. An assembly according to claim 1 in which the endless drive member comprises a toothed drive belt, and the rotary drive member comprises a toothed drive wheel engaging the toothed drive belt.

13. Apparatus according to claim 1 in which the said means for urging the guide member against the endless drive member includes means for varying the force applied to urge the guide member against the endless drive member.

14. A drive assembly comprising:
an elongated endless drive member;
a rotary drive member, the endless drive member being engaged on the rotary drive member for being driven by the rotary drive member and having a strand extending from said rotary drive member which in operation of the drive assembly is tensioned by the drive of the rotary drive member;
a guide wheel defining a guide surface around the perimeter of the wheel; and
mounting means for mounting said guide wheel and for urging said guide wheel against the endless drive member on said tensioned strand of the endless drive member and on that side of the tight strand of the endless drive member which is opposite that engaged by the rotary drive member;
the guide surface of the guide wheel being positioned in the region of initial engagement of the endless drive member on the rotary drive member.

15. Apparatus according to claim 14 in which the elongated drive member comprises a drive chain, and the rotary drive member comprises a drive sprocket.

* * * * *